Patented Feb. 7, 1939

2,146,682

UNITED STATES PATENT OFFICE 2,146,682

PROCESS OF PREPARING ACTIVE EXTRACTS OF THE ANTERIOR LOBES OF THE HYPOPHYSIS

Carl Ludwig Lautenschlager, Frankfort-on-the-Main, and Willy Ludwig, Frankfort-on-the-Main-Hochst, Germany, assignors to Winthrop Chemical Company, Inc., New York, N. Y., a corporation of New York No Drawing. Application January 9, 1937, Serial No. 119,869. In Germany January 18, 1936

2 Claims. (Cl. 167—74)

The present invention relates to a process of preparing active extracts of the anterior lobes of the hypophysis.

We have found that active extracts of the anterior lobes of the hypophysis may be prepared by subjecting fresh or pre-treated glands to an autolysis in an aqueous alcoholic solution in the presence of an ester of a low acid of the aliphatic series, suitably of ethyl acetate, and a preservative, such as toluene, benzene, xylene or chloroform. This process avoids injury to the active substances even during a prolonged autolysis and at the same time it has the advantage that in the alcoholic-aqueous solution a large portion of the non-specific albuminous substances is precipitated which in a purely aqueous liquid would have subsequently to be removed with a considerable loss of active substance.

Furthermore, owing to the addition of an ester, the coloring matter of the blood which is still contained in the fresh glands does not dissolve; in consequence thereof there are obtained directly lighter extracts of the active substance than after an autolysis with toluene alone.

According to the new process extracts of the anterior lobes of the hypophysis are obtained having a high content of gonadotropic substance, i. e. the substance which causes the characteristic premature development and increase in weight of the testicles of young cocks and growth of the combs of said cocks. Furthermore these extracts contain the thyreotropic substance of the anterior lobes of the hypophysis, the synergistic factor described in literature and the factor promoting the lactation.

The following examples serve to illustrate the invention, but they are not intended to limit it thereto:

1. 100 grams of the anterior lobes of the hypophysis of cattle are ground and 10 cc. of a mixture of equal parts of toluene and ethyl acetate are added. The whole is mixed with 100 cc. of an alcohol of 50 per cent strength and agitated for 5 days and then centrifuged. 115 cc. of an extract are obtained. This extract is concentrated under reduced pressure to half its volume, freed thereby from toluene, ethyl acetate and to a large extent from alcohol and is further purified and worked up according to known methods.

2. 10 cc. of a mixture of equal parts of toluene and ethyl acetate and 100 cc. of an alcohol of 50 per cent strength are added to 15 grams of glands which has previously been extracted in the cold state four times with 15 grams of acetone each and then once with water and the whole is further treated as described in Example 1.

About 90 to 100 per cent of the gonadotropic substance contained in the starting material is obtained in the extract.

We claim:

1. In the process of preparing active extracts of the anterior lobes of the hypophysis the step which comprises subjecting the anterior lobes of the hypophysis to an autolysis in an aqueous alcoholic medium in the presence of ethyl acetate and a preservative.

2. In the process of preparing active extracts of the anterior lobes of the hypophysis the step which comprises subjecting the anterior lobes of the hypophysis to an autolysis in an aqueous alcoholic medium in the presence of ethyl acetate and toluene.

CARL LUDWIG LAUTENSCHLÄGER.
WILLY LUDWIG.